United States Patent [19]

Kendig

[11] Patent Number: 4,467,429
[45] Date of Patent: Aug. 21, 1984

[54] AIRCRAFT THRUST CONTROL SCHEME FOR TERRAIN FOLLOWING SYSTEM

[75] Inventor: Warren C. Kendig, Elliott City, Md.

[73] Assignee: The United States of America as represented by the Secretary of the Air Force, Washington, D.C.

[21] Appl. No.: 339,204

[22] Filed: Jan. 13, 1982

[51] Int. Cl.³ .......................... G05D 1/08; G06G 7/78
[52] U.S. Cl. ................................. 364/433; 364/440; 343/7 TA; 340/967; 244/182
[58] Field of Search .............. 364/433, 431.01, 431.02, 364/434, 440; 340/27 AT, 27 SS, 27 NA; 244/181, 182, 180; 343/7 TA

[56] References Cited

U.S. PATENT DOCUMENTS

| | | | |
|---|---|---|---|
| 3,404,398 | 10/1968 | Hoban | 343/7 TA |
| 3,530,465 | 9/1970 | Treffeisen | 343/7 TA |
| 3,908,934 | 9/1975 | Schloeman | 364/440 |
| 4,041,341 | 8/1977 | Hart | 340/27 AT |
| 4,058,710 | 11/1977 | Altmann | 364/433 |
| 4,067,520 | 1/1978 | Hill | 364/433 |
| 4,093,158 | 6/1978 | Clews et al. | 364/440 |
| 4,114,842 | 9/1978 | Hofforbes et al. | 364/443 |
| 4,224,669 | 9/1980 | Brame | 364/433 |

FOREIGN PATENT DOCUMENTS

| | | | |
|---|---|---|---|
| 857517 | 12/1970 | Canada | 343/7 TA |
| 1033828 | 6/1978 | Canada | 364/433 |

Primary Examiner—Jerry Smith
Assistant Examiner—Michael R. Fleming
Attorney, Agent, or Firm—Donald J. Singer; Bernard E. Franz

[57] ABSTRACT

This system permits speed variation within certain constraints. The minimum speed is derived from a stall avoidance or acceleration margin condition and the maximum speed may be the lower limit of the transonic region or other design limit. Assuming the throttle is set at or near a trim value, adjustments need only be made if the terrain following flight path is tending to drive the speed to one of the two velocity extremes. Velocity predictions are based on predicted kinetic energy being equal to the difference between the current kinetic energy and the potential energy to the profile extreme. The throttle is adjusted when the predicted velocity is outside the limits to add or remove the required amount of energy.

6 Claims, 9 Drawing Figures

AIRCRAFT THRUST CONTROL SCHEME FOR TERRAIN FOLLOWING SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to improved aircraft throttle control apparatus for the optimum operation of an aircraft, more particularly for a terrain following (TF) system.

Aircraft thrust or throttle control historically has not been integrated with terrain following flight path angle control systems. Throttle control has been a manual function performed by the pilot who makes throttle adjustments to maintain nominally constant speed or to avoid excessive speed buildup during dives or excessive fall off during climbs. Some terrain following aircraft (e.g., B-1) have automatically implemented speed or mach number hold systems which have been suggested for use during terrain following flight. The mach number or speed hold rationale constitutes the current practice in throttle control for terrain following. It is unsatisfactory in a number of respects. In a typical mach hold auto throttle mechanization the commanded thrust or throttle setting is formed by feedback of mach number error, mach number rate error, and flight path angle summed through appropriate gains. The command structure operates well under nominally level flight to control to a desired mach number. During terrain following flight, however, even over moderately hilly terrain the system tends to give min-to-max variations in thrust in synchronism with the hills and valleys, as a component of thrust is commanded to balance the projection of weight along the flight vector. This component can be quite large and can exceed the incremental thrust capabilities of the engines particularly in an aircraft with a low thrust to weight ratio. As a result, a system of this type can be frequently saturated during TF flight, exhibiting bang-bang type control which is deleterious to engine life and unnecessary in terms of terrain following requirements. A certain amount of speed variation can be tolerated while terrain following as long as speed fall off during climbs is not so great as to risk aircraft stall or speed buildup during dives is not excessive. The speed hold philosophy for TF fails to take proper account of the fact that constant speed may not be possible in a thrust-limited aircraft attempting to hug closely rugged terrain. Additionally, the only anticipation built into mach hold scheme is through flight path angle which specifies a need for a power setting or thrust level to prevent speed change but does not address the consequences in the event that the thrust level cannot be delivered by the engines. In the past this problem has been circumvented by establishing a priori climb and dive limits to be observed during terrain following flight which attempt to limit speed changes to an acceptable level. These limits, however, are quite small in aircraft with low thrust to weight ratios and terrain following is consequently restricted.

Heretofore terrain following command computers have been analog and not particularly suited to the handling of stored data required by the disclosed algorithm. Further, the question of throttle control has been generally avoided by the compromise suggested above, i.e., the specification of climb/dive limits.

An example of an analog control system for throttle control is shown in U.S. Pat. No. 3,908,934, by Schloeman which is operative for several modes from take-off, through cruising, to landing, but does not include terrain following. An example of a digital control system for an aircraft is shown in U.S. Pat. No. 3,940,094 by Kreiss et al for a Wing Sweep Control System.

SUMMARY OF THE INVENTION

An object of the invention is to provide for improved thrust control coordinated with the characteristics of the terrain profile.

The scheme according to the invention recognizes that from the standpoint of terrain following, speed variation is allowed. In fact existing terrain following flight path angle control algorithms adapt to give consistently stable terrain following response regardless of speed. Nevertheless certain speed constraints must be observed. These constraints are minimum and maximum values. The minimum speed is derived from a stall avoidance or acceleration margin condition and the maximum speed is the lower limit of the transonic region or more particularly the highest speed for which the TF system is designed to operate. Assuming the throttle is set at or near a trim value for the current nominal speed, adjustments need only be made if the terrain following flight path is tending to drive the speed to one of the two velocity extremes. Thus, a reasonable throttle adjustment rationale is to do nothing unless anticipated speed falls off during a climb leads toward stall or inadequate acceleration margin or unless anticipated speed buildup during a dive is excessive.

DETAILED DESCRIPTION

The improved thrust control scheme coordinates the thrust or throttle control with the characteristics of the terrain profile. Such an approach is to recognize that speed variation is permissible but that the control should be designed to avoid exceeding minimum and maximum limits. The calculations required to derive thrust commands which will control speed between the proper limits involve information from the terrain profile ahead of the aircraft and information about the lift and thrust capabilities of the aircraft.

Figure 1:
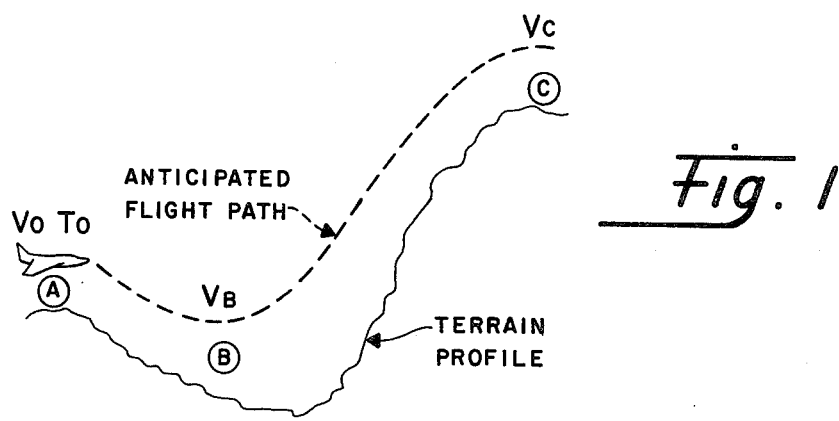
FIGS. 1 and 2 are diagrams of terrain profiles and anticipated flight paths which illustrates the concept of the invention.

FIG. 1 illustrates the concept. The aircraft is currently at position (A) with speed $V_o$ and thrust $T_o$. $T_o$ is the level flight trim value for $V_o$. Ahead of the aircraft lies valley (B) and mountain (C). If the thrust is not adjusted the aircraft will pick up speed in the descent to (B) and lose speed in the ascent to (C). The rationale stipulates that if $V_B$ and $V_C$ are within limits no throttle adjustments need be made.

Minimum and Maximum Speed Limits

The maximum speed limit is a fixed constant $V_{MAX}$ set by the TF system designer, possibly to satisfy such constraints as
(a) avoidance of transonic region
(b) avoidance of engine overspeed
(c) avoidance of high speed regions where TF performance degrades
(d) avoidance of speeds above which the TF control system is not properly compensated.

The minimum speed limit is a derived value $V_{MIN}$. $V_{MIN}$ is the speed which gives sufficient lift to yield a specified normal acceleration capability at maximum angle of attack or, alternatively, maximum lift coefficient. The lift capability is called acceleration margin and defined by equation 1.

$$\text{Acceleration margin (gees)} = g_{InMAX} = \frac{1}{2} \rho \frac{V^2 S C_{LMAX}}{W} - 1 \quad (1)$$

$g_{InMAX}$ = Incremental normal acceleration on aircraft at maximum lift coefficient. (gees)
$\rho$ = Air density (slugs/ft$^3$)
V = Aircraft speed (ft/sec)
S = Aircraft equivalent wing area (ft$^2$)
$C_{LMAX}$ = Maximum lift coefficient of aircraft (unitless)
W = Aircraft weight (pounds)

The minimum speed requirement follows after a minimum value for $g_{InMAX}$ is specified. $V_{MIN}$ is given by equation 2.

$$V_{MIN} = \sqrt{\frac{2W(g_{REQ} + 1)C_{LMAX}}{\rho S}} \quad (2)$$

$g_{REQ}$ = Acceleration Margin required at minimum velocity (gees)

Velocity Prediction

Figure 2:
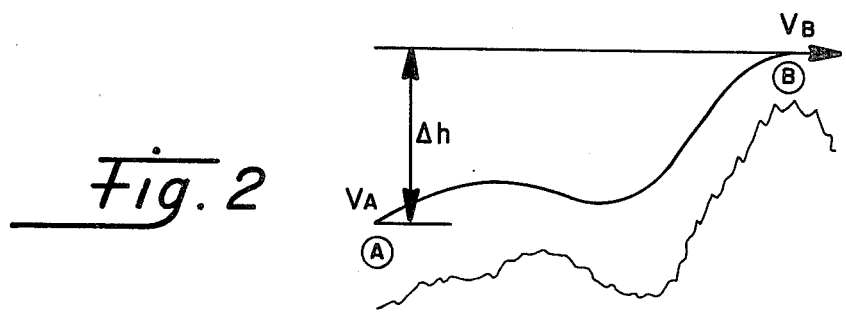

If the engine thrust over an interval is set to balance the average aerodynamic drag, then a reasonable prediction of aircraft speed can be made on the basis of the interchange of kinetic and potential energy. Refer to FIG. 2. If while traversing the interval (A) to (B) the engine thrust is approximately equal to the average aerodynamic drag over the interval, then the velocity at point (B) is approximately as follows:

$$\frac{1}{2} m V_B^2 = \frac{1}{2} m V_A^2 - W \Delta h$$

and using W = mg $$V_B = \sqrt{V_A^2 - 2g \Delta h} \quad (3)$$

Simulation results have shown this prediction equation to yield errors no greater than 2% under realistic terrain following conditions.

An additional margin of safety can be observed by overstating the highest profile height; i.e., by adding a fixed altitude increment to $\Delta h$ in FIG. 2. This artifice covers the contingency of towers or mountain summits belatedly detected due to low radar reflectivity or masking.

Establishing Trim Thrust

The accuracy of the velocity prediction depends on the extent to which the nominal power setting equals the average aerodynamic drag over the prediction interval. The simulation results showed that if the power setting is the level flight trim value for the nominal aircraft speed the prediction is quite good. The nominal power setting can be established by various techniques, two possible methods being:

(1) Manually—The pilot sets the throttle over level or gently rolling terrain for the desired nominal speed. He could make periodic adjustments to compensate for changes in weight.

(2) Automatically by a stored table of thrust over average drag—This table would express average drag as a function of speed, weight, wing sweep and possible other parameters.

Thrust Increment Equation

The energy equation (equation (3)) is used to predict the aircraft's velocity at the highest and lowest points in the terrain profile as measured by the terrain following radar. It is assumed that the terrain following flight path will clear these points by the desired set value. This assumption will eventually hold for the highest point and may lead to a conservative (high) velocity estimate for the low point. If the projected states are not within the limits, the velocity deficiency or excess translates into a requirement to add or remove energy from the system. The required or target kinetic energy at the profile high point is given by equation (4)

$$KE_{REQ} = \frac{W^2(g_{REQ} + 1)}{\rho S C_{LMAX}} \quad (4)$$

$KE_{REQ}$ = Kinetic Energy required at the peak to give Acceleration margin $g_{REQ}$ (ft-lbs)
$\rho$ = Air density at profile high point (slugs/ft$^3$)

The target kinetic energy at the profile low point is given by equation (5)

$$KE_{REQ} = \frac{1}{2} \frac{W}{g} V_{MAX}^2 \quad (5)$$

$V_{MAX}$ = Maximum velocity limit of system

The energy requirements at the profile extremes are given by equations (4) and (5). The predicted kinetic energy is given by the velocity prediction equation.

$$KE_P = \frac{1}{2} \frac{W}{g} V_o^2 - W \Delta h$$

$KE_P$ = Predicted Kinetic energy (ft-lbs)
$V_o$ = Current Velocity (ft/sec)
W = Weight (lbs)
g = Acceleration of gravity (ft/sec$^2$)
$\Delta h$ = Height differential to profile extreme, positive for a high point (above aircraft), negative for a low point (below aircraft) (ft).

If with respect to the high point $KE_{REQ} < KE_P$, there is an energy deficiency such that:

$$\Delta E = KE_{REQ} - KE_P$$

If with respect to the low point $KE_{REQ} < KE_P$, there is an energy excess such that again $$\Delta E = KE_{REQ} - KE_P$$

E thus is positive for an energy input requirement and negative for an energy removal requirement. The energy differential is added by adjusting the throttle away from its current trim value. There is latitude in the rate at which the energy is added or removed. The only restriction is that the following integrals hold.

$$\int \Delta T ds \geq \Delta E \text{ for climbs} \quad (7)$$

$$\int \Delta T ds \leq \Delta E \text{ for dives}$$

Note the appropriate inequality for climbs and dives. The integral is over the distance to the profile extreme.
T=Thrust increment effected by the throttle movement (lbs)
Two methods, among many, for implementing equation (7) are
I. Full throttle movement for a sufficient duration.

$$T = T_{\{MAX\}\atop\{MIN\}} - T_{TRIM}$$

$$\text{Duration: } \Delta t = \frac{\Delta E}{V_o (T_{\{MAX\}\atop\{MIN\}} - T_{TRIM})}$$

II. Partial Throttle for the entire interval $$\Delta T = \frac{\Delta E}{R_{\{MAX\}\atop\{MIN\}}}$$

$T_{\{MAX\}\atop\{MIN\}}$ = Total engine thrust at the maximum or minimum power settings (lbs)

$T_{TRIM}$ = Trim value of thrust for nominal velocity desired, or alternatively, the estimated average drag over the prediction interval (lbs)

$V_o$ = Current velocity (ft/sec)

$\Delta t$ = Time duration of throttle action for type I implementation.

$R_{\{MAX\}\atop\{MIN\}}$ = Range to high or low point in profile (ft)

The type I implementation adds the energy differential at the fastest rate. Type II adds the differential over the entire interval at the lowest average rate.

There is, of course, no guarantee that the energy differential can be satisfied with the thrust increments given by $T_{MAX}$ or $T_{MIN}$. In this event the energy delta must be appropriately augmented by afterburners or removed by speed brakes. In this manner the disclosed scheme provides advanced warning of and calls for appropriate emergency action when the normal thrust range is inadequate.

Thrust Control Implementation

Figure 3A:
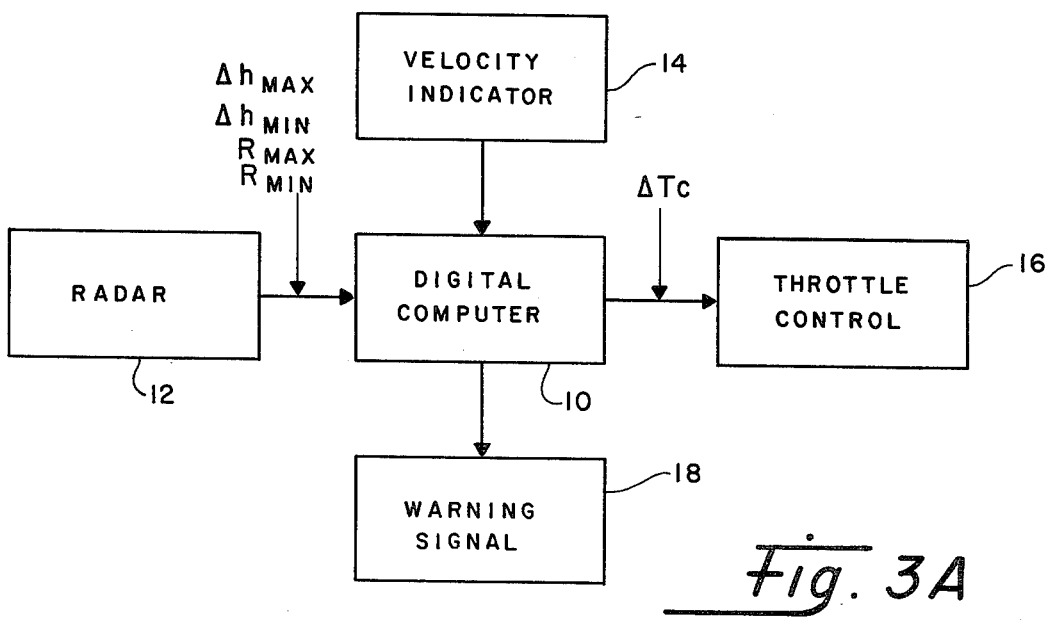
FIG. 3A is a system block diagram.
Figure 3:
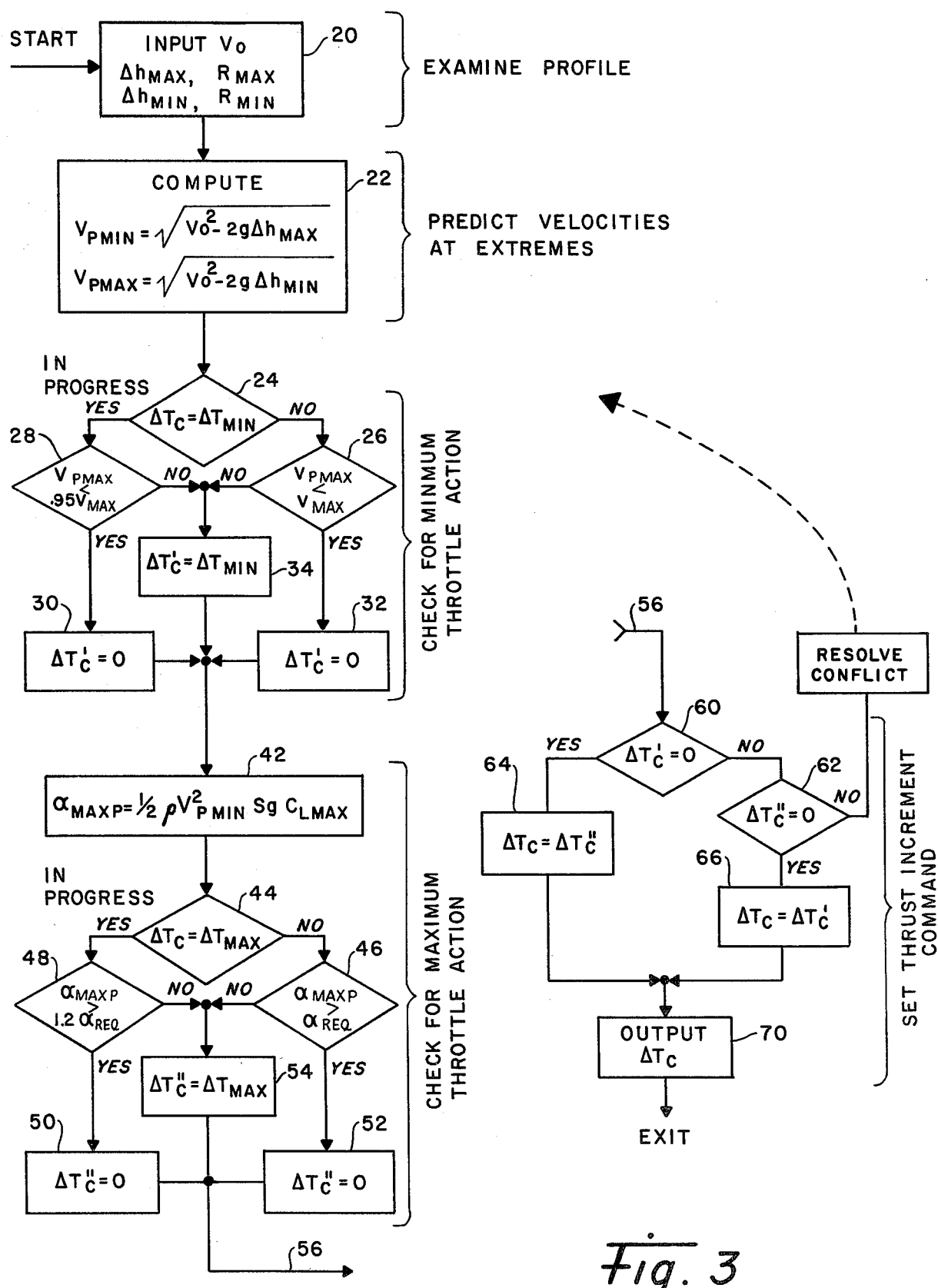
FIG. 3 is a flow chart of the algorithm.

The flow chart of FIG. 3 and system block diagram of FIG. 3A shows a type I implementation. This flow chart may be implemented by a digital computer 10 operating in a real-time control mode with appropriate input/output circuits. Inputs are required from the radar equipment 12, and from a velocity indicator 14. Output is required to the throttle control 16, for one of three settings, trim ($\Delta T_c = 0$), minimum throttle ($\Delta T_c = \Delta T_{MIN}$) and maximum throttle ($\Delta T_c = \Delta T_{MAX}$). Output may at times also be required for a warning signal 18.

In FIG. 3, block 20 represents the process of using the radar equipment to search the profile ahead to determine the change of altitude $\Delta h_{MAX}$ and $\Delta h_{MIN}$ from the present position to the high and low points, the range $R_{MAX}$ and $R_{MIN}$ to these points, and the input of these values to the computer.

At block 22, the velocity projections are made. These are the velocities which will be attained at the projected high and low points if the throttle is set at the trim value, using equation (3). The value $V_o$ is the current velocity.

The next section of the flow chart is the check for minimum throttle action. Minimum throttle action is a request for minimum thrust. The first decision block 24 determines if a minimum throttle action is already in progress. If not, then the next decision is at block 26, where the predicted maximum velocity is checked against the predetermined allowable maximum value $V_{MAX}$. On the other hand, if a minimum throttle action is already in progress (set to $\Delta T_{MIN}$ in a previous cycle), the next decision from block 24 is at block 28. Here the check is made against 95% of $V_{MAX}$. This provides "logic hysteresis" which prevents switching on noise. An intermediate variable $\Delta T_c'$ is used to store the result of the decision. At block 30, 32 or 34 it is set to zero for the "yes" branch and to $\Delta T_{MIN}$ for the "no" branch from either block 26 or 28. The net result is that a command for minimum thrust is made when the predicted maximum speed exceeds the minimum allowable. The command is restored to zero when the predicted maximum speed falls below 95% of the maximum allowable.

The next section of the flow chart is the check for maximum throttle action. First at block 42 the projected acceleration margin at the trajectory high point is computed. Then the decision block 44 is used to determine if a maximum throttle action is already in progress, and then in one of the decision blocks 46 or 48 the projected acceleration is compared with a predetermined required value or 1.2 times that value, depending on whether action is not or is in progress. Another intermediate value $\Delta T_c''$ is used to store the result. At block 50, 52, or 54 it is set to zero for the "yes" branch and to $\Delta T_{MAX}$ for the "no" branch from either block 46 or 48. The outcome is a command for maximum thrust when the predicted acceleration margin is less than the required value. The command is restored to zero when the projected margin rises above 1.2 times the required value. Here again logic hysteresis prevents switching on noise.

Before setting the thrust increment command, a possible conflict between minimum and maximum throttle actions is resolved. The flow chart follows line 56 to decision block 60. If the decision blocks 60 and 62 show that both intermediate values $\Delta T_c'$ and $\Delta T_c''$ are other than zero, then there is a conflict. Note that it may, under some circumstances, be possible to satisfy both constraints. This would be true if the range intervals involved were long enough to allow removal of the energy required to satisfy the maximum speed constraint and then to add back that energy plus the computed increment to satisfy the minimum speed constraint. If the conflict cannot be resolved in this manner it is necessary to further limit the negative altitude differential $\Delta h_{MIN}$.

If both $\Delta T_c'$ and $\Delta T_c''$ are zero, then in block 64 the parameter $\Delta T_c$ is set to zero. If only one of the intermediate values is zero, then $\Delta T_c$ is set equal to the other in one of blocks 64 or 66. The resulting value of $\Delta T_c$ is then output at block 70 to control the throttle setting.

It will be readily apparent that the check for minimum throttle action and the check for maximum throttle action may either be done first, or they could even be done at the same time in parallel processors.

Experimental Results

Figure 4:
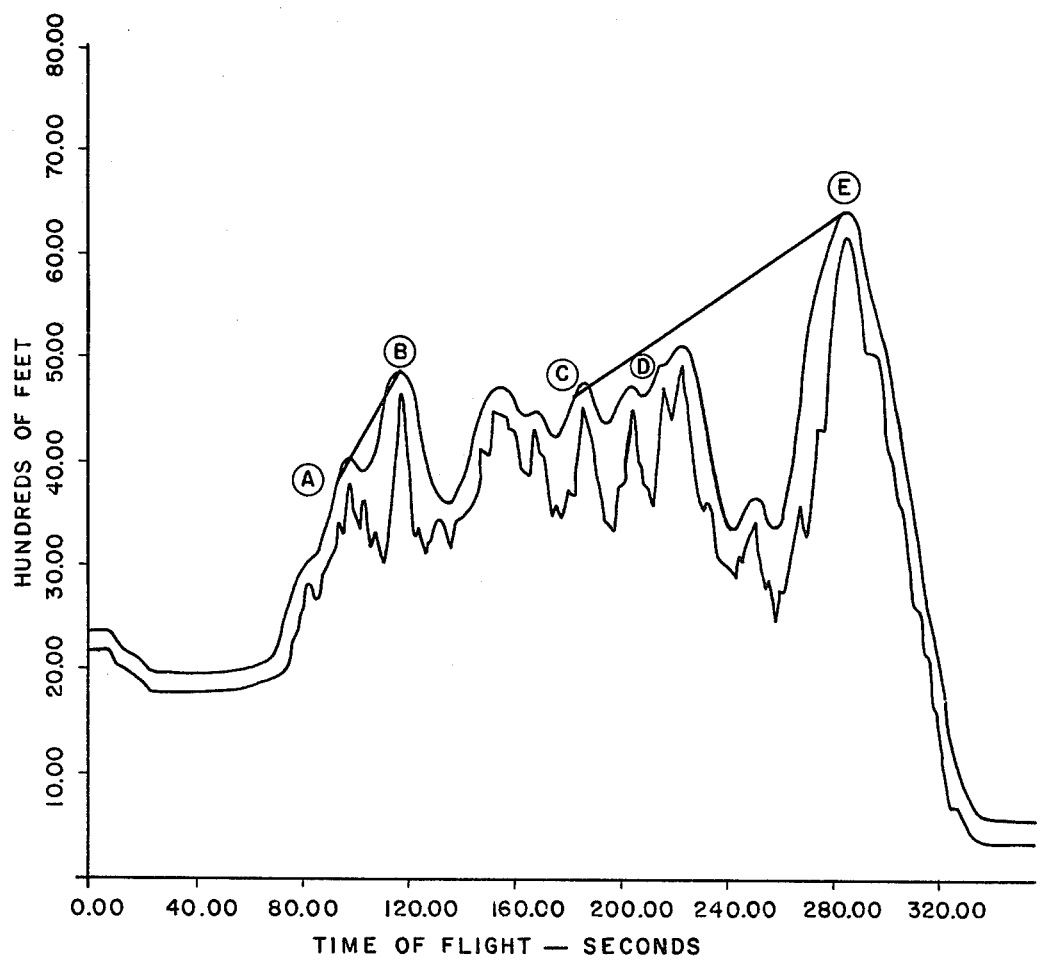
FIGS. 4-8 are graphs showing the operation of the scheme for some parameters versus time of flight.
Figure 5:
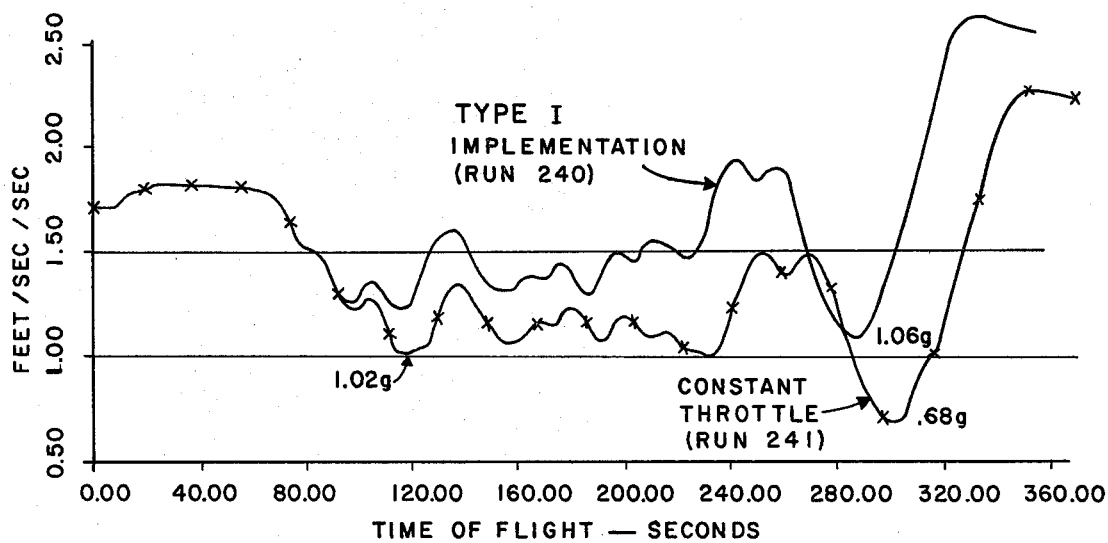
Figure 6:
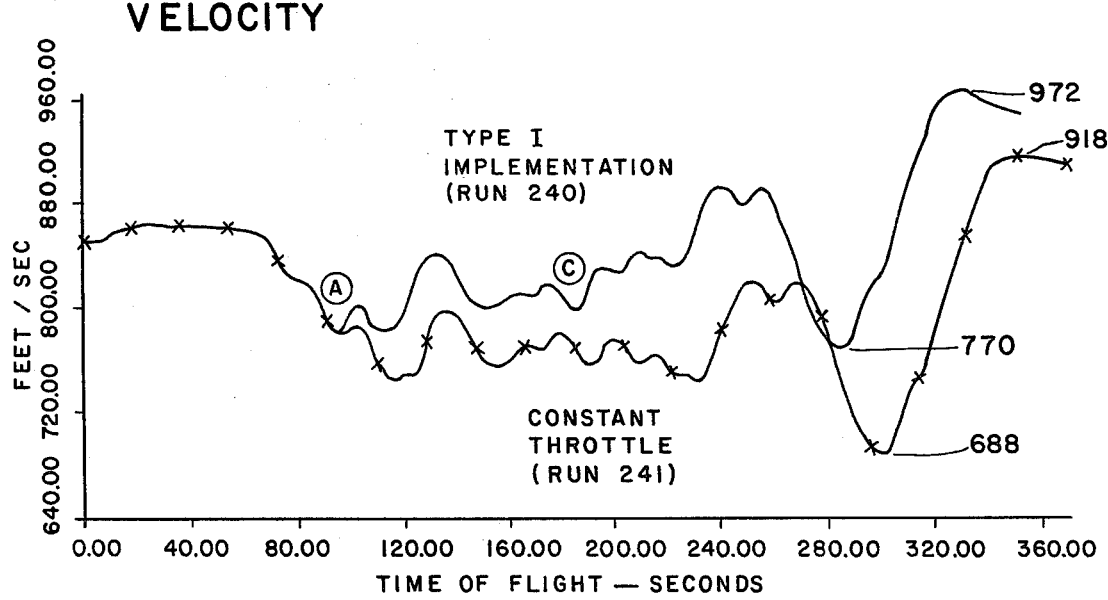
Figure 8:
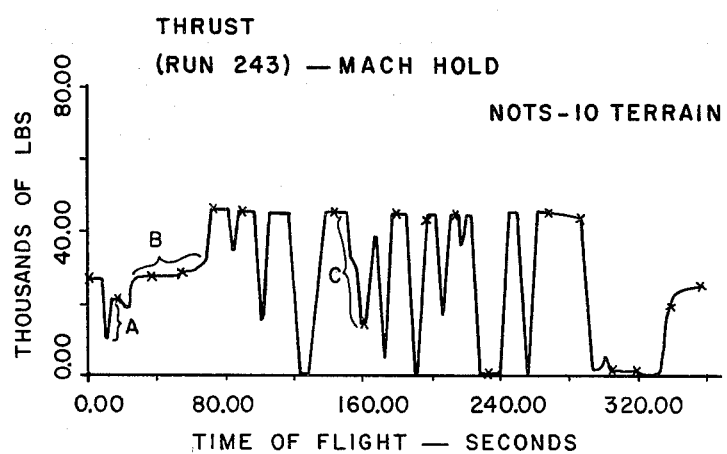
Figure 7:
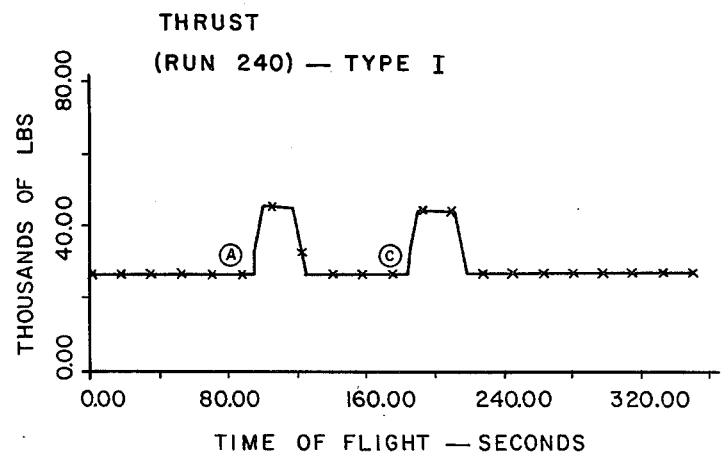

Experimental results were obtained by simulation. FIG. 4 shows a flight profile for a typical terrain following system. The terrain is a segment of the Rocky Mountains known as the NOTS-10 Course. FIG. 5 shows the corresponding acceleration margin time history compared with that given by a constant throttle configuration. FIG. 6 shows the velocity time history compared to that of a constant throttle configuration. FIG. 7 shows the thrust time history given by the type I control scheme. Looking at FIG. 4, the command structure projects 2 speed deficiencies: One at (A) looking up to (B), and the other at (C) looking up to (E). Thus, maximum thrust is commanded at (A) and (C) persisting in each case until the projected acceleration margin (based on trim thrust) rises above 1.2 g's. These are points (B) and (D) respectively. FIG. 5 shows that the acceleration margin for the type I implementation is above 1 g (the required value set in) for the entire run, indicating proper operation of the algorithm. FIG. 6 shows that the velocity never exceeded the maximum allowable value (1000 ft/sec for this run). FIG. 7 shows the two maximum throttle actions called for during the run. An important advantage of the implementation is illustrated in FIG. 8 which shows the thrust time history compared to that given by a mach hold auto throttle system over the same course. Note the highly active nature of the mach hold time history with many full throttle cycles.

Thus, while preferred constructional features of the invention are embodied in the structure illustrated herein, it is to be understood that changes and variations may be made by the skilled in the art without departing from the spirit and scope of my invention.

I claim:

1. A throttle control system for an aircraft in which thrust is controlled by throttle settings, operating in a terrain following mode using a base throttle setting for a trim value of thrust for a nominal velocity desired for level flight, and having storage means containing predetermined values for maximum and minimum velocity, a predetermined acceleration margin, and given values relating to lift and thrust capabilities of the aircraft, said system comprising:
   (a) input means to obtain values of the low and high points based on a search of terrain profile ahead of the aircraft from radar instruments, and means to obtain a value of the current velocity;
   (b) prediction means comprising computation means using the values obtained by the input means of the high and low points, and of the current velocity to predict the maximum and minimum velocities over said profile with said trim value of thrust;
   (c) first checking means to check for reduced throttle action including first comparison means using values from said prediction means and said storage means to determine whether "yes" the predicted maximum velocity is less than the predetermined maximum velocity or "no" it is not, and means responsive to the result from the first comparison means to set a first intermediate variable to a first or second value for "yes" or "no" respectively;
   (d) second checking means to check for increased throttle action, including further computation means using values from the prediction means and the given values from the storage means to calculate a projected acceleration margin at the trajectory high point, and second comparison means to determine whether "yes" the projected acceleration margin is greater than said predetermined acceleration margin at said high point or "no" it is not, and means responsive to the result from the second comparison means to set a second intermediate variable to a first or second value for "yes" or "no" respectively;
   (e) output means effective after operation of the first and second checking means for setting a command variable to a first value, a value of a second set, or a value of a third set, using the values of the first and second intermediate variables, the command variable being set to its first value responsive to the first and second intermediate variables both having their first value, the command variable being set to a value of the second set responsive to the first and second intermediate variables having their second and first values respectively, and the command variable being set to a value of the third set responsive to the first and second intermediate variables having their first and second values respectively, and means for supplying the value of the command variable to throttle control apparatus to maintain said base throttle setting, to provide a decreased thrust increment, or to provide an increased thrust increment, depending upon the command variable having the first, second or third value respectively.

2. A throttle control system according to claim 1, which is a digital processor comprising said storage means and said means (a) through (e), operating in repetitive logic cycles from start to exit with each of the means operative once per cycle, starting with the input means (a), followed by the prediction means (b) then the first and second checking means (c) and (d), and finally the output means (e).

3. A throttle control system according to claim 2, wherein the throttle control apparatus provides throttle settings which include said base setting, a minimum setting and a maximum setting, wherein the throttle settings are controlled by said command variable which may have any one of three values which are said first value, a second value being said second set, and a third value being said third set to respectively provide throttle settings of base, minimum or maximum,
   wherein said first checking means (c) comprises a decision means to determine if said command is at the second value, the first comparision means being operative to compare the predicted maximum velocity either to said predetermined maximum velocity or to a given fraction below it responsive to the result of the decision means being respectively "no" or "yes";
   wherein said second checking means (d) includes a further decision means to determine if said command is at the maximum value, the second comparison means being operative to compare the projected acceleration margin either to said predetermined acceleration margin or to a given fraction above it responsive to the result of the last said decision means being respectively "no" or "yes".

4. A throttle control system according to claim 3, wherein said prediction means (b) uses the formulas $$V_{PMIN} = \sqrt{V_o^2 - 2g \Delta h_{MAX}}$$

$$V_{PMAX} = \sqrt{V_o^2 - 2g \Delta h_{MIN}}$$

wherein
$V_{PMIN}$ is the predicted minimum velocity,
$V_{PMAX}$ is the predicted maximum velocity,
$V_o$ is current velocity,
$\Delta h_{MAX}$ and $\Delta h_{MIN}$ are said high and low points vertical distance with respect to current altitude;
wherein said means to calculate a projected acceleration margin uses the formula $$a_{MAX_p} = \tfrac{1}{2} \rho V_{PMIN}^2 S g C_{LMAX}$$

wherein
$\rho$ is air density,
S is aircraft equivalent wing area,
g is acceleration of gravity,
$C_{LMAX}$ is maximum lift, coefficient of the aircraft.

5. A throttle control system according to claim 4, wherein said given fraction below of the first checking means (c) is approximately 0.85, and said given fraction above of the second checking means (d) is approximately 1.2.

6. The method of throttle control for an aircraft operating in a terrain following mode over a terrain profile having an altitude at each point including high and low points measured by radar instruments with respect to a current altitude, using a base throttle setting for a trim value of thrust for a nominal velocity desired for level flight, having a current velocity which may differ from the nominal velocity at any particular time; having storage means containing predetermined values for maximum and minimum velocity, a predetermined acceleration margin, and given values relating to lift and thrust capabilities of the aircraft; the aircraft having kinetic and potential energy at each point which are functions of the velocity, altitude, and said given values; wherein said method uses a digital processor operating in repetitive cycles with steps comprising:

obtaining and storing values for the low and high points of the terrain profile ahead of the aircraft, and obtaining and storing a value for the current velocity;

predicting maximum and minimum velocities at the low and high points respectively with said trim value of thrust by a calculation using the stored values for the high and low points and the current velocity, and using formulas based on predicted kinetic energy being equal to total energy which is the sum of current kinetic energy and potential energy with respect to the low and high points respectively;

calculating a projected acceleration margin based on the predicted minimum velocity and given values relating to the aircraft structure and its load;

determining by comparison whether the predicted maximum velocity and projected acceleration margin are within predetermined limits, and if so setting the throttle control to a base position for a trim value of thrust; calculating $\Delta E$ which is an amount of energy equal to the difference between kinetic energy required and kinetic energy predicted as functions respectively of said predetermined limits and said predicted velocities; and if said predicted maximum velocity and projected acceleration margin are not within the predetermined limits, changing the throttle control from said base position such that the integral of the thrust increment with respect to its trim value over the distance to a profile extreme is greater than or equal to $\Delta E$ for climbs and less than or equal to $\Delta E$ for dives.

* * * * *